May 1, 1928.

J. W. WELSH 1,668,097

METHOD OF MAKING SPECTACLE TEMPLES

Original Filed March 10, 1923

INVENTOR.
James W. Welsh
BY
David Rives
ATTORNEY.

Patented May 1, 1928.

1,668,097

UNITED STATES PATENT OFFICE.

JAMES WILSON WELSH, OF PROVIDENCE, RHODE ISLAND, ASSIGNOR TO BAUSCH & LOMB OPTICAL COMPANY, OF ROCHESTER, NEW YORK, A CORPORATION OF NEW YORK.

METHOD OF MAKING SPECTACLE TEMPLES.

Original application filed March 10, 1923, Serial No. 624,125. Divided and this application filed March 28, 1927. Serial No. 178,895.

The present invention relates to methods of making spectacle temples, and it has for its chief object to provide a temple of the non-metallic type with an improved, flexible hook. The present application is a division of a copending application, Serial No. 624,125, filed March 10, 1923, now Patent 1,636,340 dated July 19, 1927.

With this and other objects in view, the nature of which will appear from the following description, taken in connection with the accompanying drawings, the invention consists of the improved method of making spectacle temples and other articles hereinafter described, illustrated in the accompanying drawings and defined in the appended claims.

Figure 1:
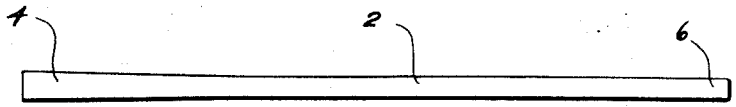
Figure 2:
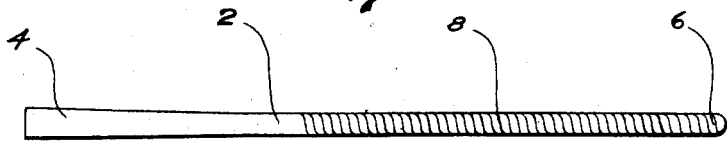
Figure 3:
Figure 4:
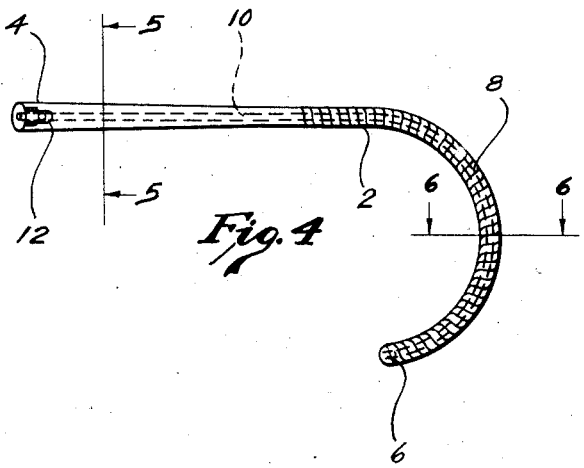
Figure 5:
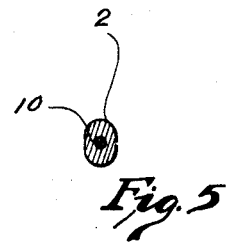
Figure 6:
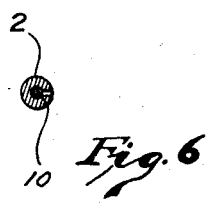

In the accompanying drawings, Figs. 1, 2 and 3 indicate three steps illustrative of the preferred method of the present invention; Fig. 4 is a view of a preferred spectacle temple made according to the method of the present invention; and Figs. 5 and 6 are sections taken upon the lines 5—5 and 6—6 of Fig. 4.

In carrying out the preferred method of the present invention, it is well to start with a tube 2 of non-metallic material, like zylonite, celluloid and the like, tapering from the larger end or shank portion 4 towards the end 6 of smaller diameter. This material, though flexible, is not sufficiently so in the form shown in Fig. 1 to produce, when the tapered end is bent into the shape of a hook or loop, a temple that may properly be called flexible. The portion of smaller diameter of the tube 2 is therefore cut into the form of a spiral or helix, as shown at 8, which renders it very yielding. By comparison, the uncut portions of the tube on both sides of the cut portions are very rigid, so that a single tubular member 2 is thus provided, having a flexible loop portion 8 coextensive with a helically disposed cut extending through the walls thereof. A metal reinforcing rod or core 10 is now inserted in the bore of the tube, and is fixed therein in any well known manner, with the free end of the metal loop embedded in the corresponding free end of the non-metallic material. The said end of the tube is closed by a plug, as illustrated. The rod 10 may be of the same material of which flexible metal temples are made, or of any other suitable material. The spiral portion 8 of the tube 2 will thus become stiffened, but it will have the same degree of flexibility as the metal rod 10. The tapered, spirally cut portion of the tube 2, with the metal rod 10 inserted therein, is then bent into a hook or temple shape, leaving the shank portions of the tube and the metal rod 10 relatively straight, as shown in Fig. 4, and the customary hinge plate 12 is added, completing the temple.

Modifications will occur to persons skilled in the art within the spirit and scope of the appended claims.

What is claimed is:

1. The method of making an article of the class described that comprises cutting a portion of a tube constituted of non-metallic material into the form of a spiral, inserting a flexible rod into the cut portion of the tube, and bending the cut portion of the tube and the rod inserted therein.

2. The method of making a spectacle temple that comprises cutting a portion of smaller diameter of a tapered tube constituted of flexible, non-metallic material into the form of a spiral, inserting a metal reinforcing rod into the tube, and bending the cut portion of the tube and the reinforcing rod inserted therein into the shape of a temple.

In testimony whereof, I have hereunto subscribed my name.

JAMES W. WELSH.